United States Patent Office 3,151,177
Patented Sept. 29, 1964

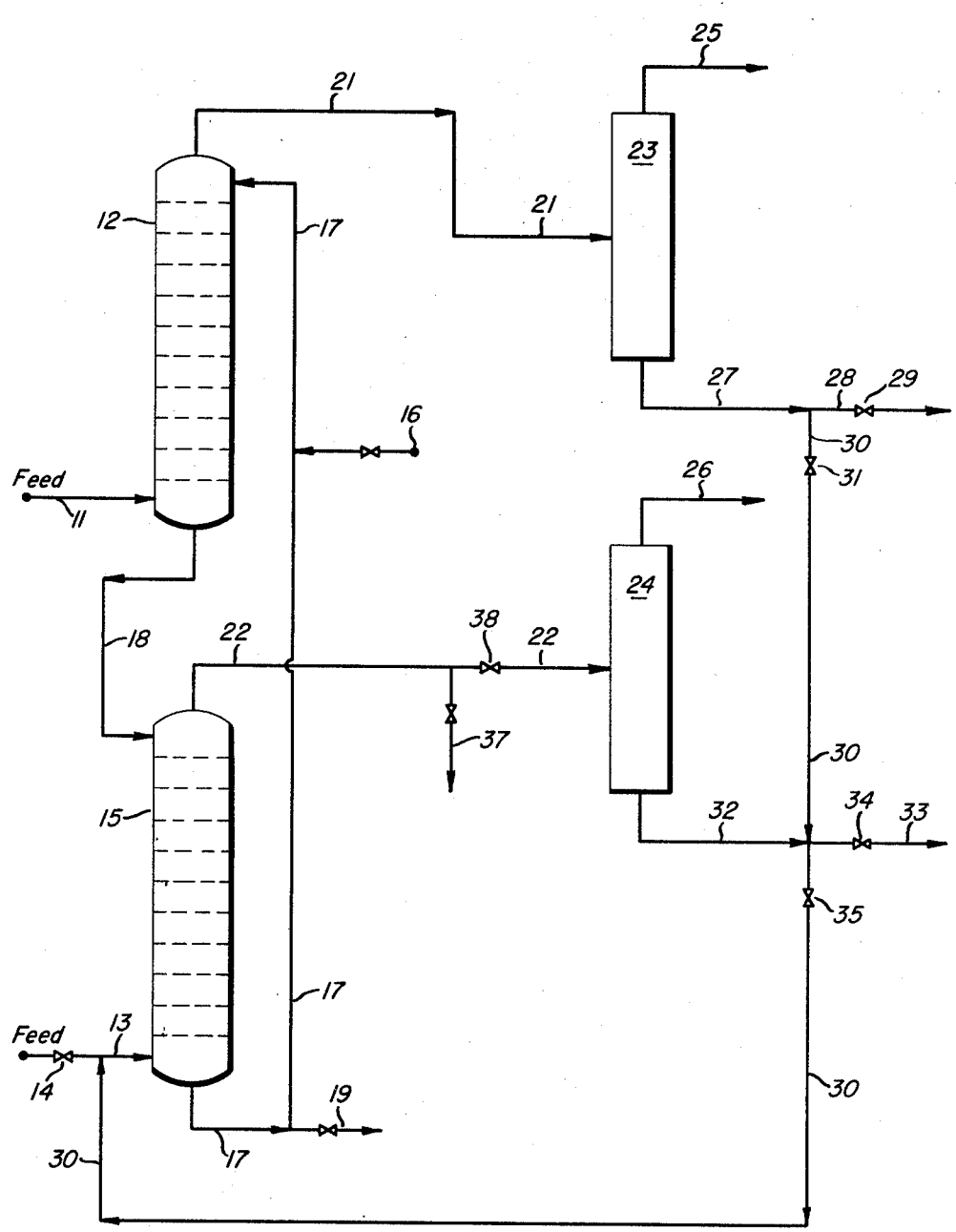

3,151,177
SEPARATION OF AROMATICS USING COPPER
FLUORIDE AND HYDROGEN FLUORIDE
Robert J. Hengstebeck, Valparaiso, Ind., and William W.
Sanders, Crete, Ill., assignors to Standard Oil Company,
Chicago, Ill., a corporation of Indiana
Filed Apr. 28, 1960, Ser. No. 25,410
17 Claims. (Cl. 260—674)

This invention relates to a process and apparatus for separating aromatic hydrocarbons from mixtures containing aromatic and nonaromatic hydrocarbons. More particularly, this invention relates to a process and apparatus for separating aromatic hydrocarbons using copper fluoride in combination with hydrogen fluoride as a separation agent.

It has been discovered that liquid HF in combination with copper fluoride is an extremely effective agent for the separation of aromatic hydrocarbons from admixture with nonaromatic hydrocarbons. Such separation is proposed, for example, by D. A. McCaulay and A. P. Lien, U.S. 2,914,584, patented November 24, 1959. In the separation, the aromatic hydrocarbons apparently form an HF-soluble complex with the copper fluoride, in the presence of HF, and are dissolved into the liquid HF acid phase. Although copper fluoride is normally insoluble in liquid HF alone, in the presence of aromatic hydrocarbons, the aromatic hydrocarbons, copper fluoride and HF merge into a single homogeneous solution with evidently some chemical reaction. In the separation, this solution constitutes the HF-soluble liquid extract phase containing copper fluoride-aromatic hydrocarbon complex and there is also formed a separate nonaromatic hydrocarbon containing HF-insoluble raffinate phase. The raffinate phase is the hydrocarbon-soluble phase and contains a lower percentage of aromatic hydrocarbons, and the extract phase contains a higher percentage of aromatic hydrocarbons with relation to components of the original mixture.

In the extraction of an aromatic hydrocarbon-containing feed, the aromatic hydrocarbon appears in the extract phase in the form of an HF-soluble copper fluoride-aromatic hydrocarbon complex. It is normally necessary to decompose the complex in the extract phase by removal of the liquid HF from the extract phase in which the complex is contained. The decomposition is for the purpose of recovering the aromatic hydrocarbon product from the extract. Because removal of liquid HF is normally necessary, it follows that there need be provided equipment for recovering and handling HF as well as equipment for converting the recovered HF back to the liquid state for reuse in the extraction process and equipment for returning the HF to an extraction zone for such reuse. Such equipment is costly and may require the appropriation of valuable space in a refinery or other processing area.

This invention provides a process and apparatus for liquid phase separation of aromatic hydrocarbons using a copper fluoride extractant wherein the copper fluoride complex with an aromatic hydrocarbon is continuously maintained in the presence of liquid HF throughout the separation process. This invention further provides such a process and apparatus for separation of aromatic hydrocarbons wherein the complex is apparently not decomposed during the separation process. The process and apparatus of this invention provide unusually sharp separation of aromatic hydrocarbons from nonaromatic hydrocarbons and eliminate equipment normally necessary for recovering and reusing liquid HF in separation process using copper fluoride extractants.

We have discovered that aromatic hydrocarbon in a copper fluoride-aromatic hydrocarbon complex may be displaced from the complex by treating the complex, in the presence of liquid HF, with an aromatic hydrocarbon-containing material. During treating of the complex in this manner, the aromatic hydrocarbon of the aromatic hydrocarbon-containing material displaces and replaces the aromatic hydrocarbon in the complex. The displacement and replacement of aromatic hydrocarbon apparently depends largely upon the amount of each aromatic hydrocarbon present during the treating and also upon differences in selectivity of copper fluoride for particular aromatic hydrocarbons, which differences in selectivity may be quite large in some cases. It is believed that in the presence of liquid HF and more than one aromatic hydrocarbon, the copper fluoride complexes with each of the aromatic hydrocarbons in proportions determined greatly by amounts of each present and selectivity factors; an equilibrium of complexes evidently is established. As an example of this equilibrium, a light aromatic hydrocarbon (LA) and a heavy aromatic hydrocarbon (HA) are contacted with cuprous fluoride in the presence of liquid HF with resulting establishment of an equilibrium such as:

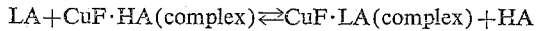

Extraction or complexing selectivity factors do vary somewhat between different aromatic hydrocarbons in many cases and the above equilibrium may be balanced for any combination of aromatic hydrocarbons by simple extraction experiments to determine selectivity factors.

We have now provided an integrated combination process utilizing the above discussed discovery for separating or concentrating aromatic hydrocarbons from a plurality of feeds. Accordingly, a feed material containing aromatic hydrocarbons and nonaromatic hydrocarbons is treated in the liquid phase with an HF-soluble copper fluoride aromatic-hydrocarbon complex in the presence of liquid HF. Preferably, the aromatic hydrocarbon of the complex boils in a range differing from the boiling range of the aromatic hydrocarbon of the feed. Feed aromatic hydrocarbon complexes with the copper fluoride and complexed aromatic hydrocarbon is set free from the complex. The complex is in like manner treated with another aromatic hydrocarbon-containing material, the aromatic hydrocarbons of which may conveniently be the same as or may correspond to the aromatic hydrocarbons formerly displaced from the complex. Displacement and replacement in the complex again occurs. The complex may then be treated with still another feed material or with the same feed material used in any prior treating step except the immediately preceding treating step. The treating steps are separated from each other in space along the flow of the extract phase (containing the complex) through the plurality of treating zones. In each treating zone, a feed material containing aromatic hydrocarbons is charged to the treating zone and the aromatic hydrocarbons of each feed displace the aromatic hydrocarbons of the complex in the extract phase from the immediately preceding treating step while the complex is flowed through the particular treating zone to which the particular feed is charged. The displaced aromatic hydrocarbons of each zone are removed in the hydrocarbon-soluble raffinate from that zone and may readily be separated therefrom, e.g. by distillation. The nonaromatic hydrocarbons of the feed material to each zone predominantly boil in a range differing from the boiling range of aromatic hydrocarbons in the feed to the immediately preceding zone. The extract phase from each treating zone comprises liquid HF and the HF-soluble complex charged to the next zone for displacement of aromatic hydrocarbons therefrom. The nonaromatic hydrocarbons of a feed are not complexed and become part of the raffinate from the zone to which the feed is charged. The aromatic hydrocarbons of the previous zone are readily separable from nonaromatic hydrocarbons in a given raffinate by distillation because of the differences in boiling ranges.

Even small amounts of feed charged to each zone will cause some displacement in the complex as is readily understood from the above illustrative equilibrium equation. The separation depends to a large extent on alternatively re-establishing the equilibrium of aromatic hydrocarbons and complex by treating the complex first with one aromatic hydrocarbon-containing feed and then with another. It is to be understood that wherever two feeds are separated herein, three or more feeds are also intended and may be separated simply by increasing the number of treating zones, by using a given treating zone for a plurality of treating steps each of which employ a different feed, or by other means which may be apparent to those skilled in the art.

More particularly, the process of this invention is a method for refining a feed material containing a hydrocarbon mixture of aromatic hydrocarbons and nonaromatic hydrocarbons. Accordingly, the feed material is treated with, e.g., is used to treat a first HF-soluble copper fluoride-aromatic hydrocarbon complex advantageously at a temperature within the range of from about −40° C. to about 150° C. and preferably at a temperature in the range of from about 10° C. to about 50° C. A first HF-soluble extract phase containing liquid HF and containing a second HF-soluble copper fluoride-aromatic hydrocarbon complex is formed and also there is formed a first hydrocarbon-soluble raffinate phase substantially insoluble in liquid HF. The aromatic hydrocarbon of the second complex predominates in aromatic hydrocarbon of the feed material. The first extract and first raffinate are then separated from each other and the first extract is treated in a second treating zone with an aromatic hydrocarbon (as feed to the second treating zone) corresponding to the aromatic hydrocarbon of the first complex advantageously at a temperature in the range of from about −40° to about 150° C. and preferably at a temperature in the range of from about 10 to about 50° C. From this treating there results a second hydrocarbon-soluble raffinate phase which is substantially insoluble in liquid HF and there also results a second HF-soluble extract phase containing both liquid HF and an HF-soluble copper fluoride-aromatic hydrocarbon complex which corresponds substantially to the first complex, i.e., substantially the same type of aromatic hydrocarbon is present therein. A first product consisting of a substantially rich fraction of aromatic hydrocarbons extracted from the feed material is separated from the first raffinate by distillation, advantageously at a temperature in the range of from about 50° C. to about 400° C. and preferably at a temperature in the range of from about 85° C. to about 250° C. The second extract is recycled to the first treating step and is used therein as the liquid HF and first complex with which the feed is treated. A second product consisting of a substantially rich fraction of the aromatic hydrocarbons contained in the second complex is separated from the second raffinate by distillation, advantageously at a temperature in the range of from about 50° C. to about 400° C. and preferably at a temperature in the range of from about 85° C. to about 250° C.

The terms "first" and "second" used as modifiers hereinabove and hereinafter are used merely to designate feeds, extracts, complexes, raffinates, products, etc., of different extractions or treating zones. For example, in a "first" extraction or contacting step, a "first" feed is extracted to form a "first" raffinate and a "first" extract; in a "second" extraction, a "second" feed is extracted, etc. The terms are not intended to differentiate in time since a "first" extraction, a "second" extraction and any other of a plurality of extractions may be concurrently carried out in different zones in accordance herewith.

It is to be understood with regard to distillation temperatures that when using high-boiling feeds higher distillation temperatures may be advantageous or even necessary for the desired separation. The distillation temperature may be adjusted to correspond with the desired cutpoint to obtain a particular desired product or products as known in the art.

In accordance with one embodiment of this invention, the first raffinate is fractionated to recover the aromatic hydrocarbon therefrom corresponding to the aromatic hydrocarbon of the first complex. At least a portion of this aromatic hydrocarbon is then recycled to the second treating zone as feed thereto, i.e. as the aromatic hydrocarbon corresponding to that of the first complex. In another embodiment at least a portion of the second product is recycled to the second treating zone as feed thereto and in still another embodiment the recovered first extract is treated with a high-purity aromatic hydrocarbon corresponding to the aromatic hydrocarbon of the first complex as feed to the second treating zone.

The apparatus of this invention is a combination of process equipment including means necessary for carrying out the above disclosed process.

In the process and apparatus of this invention, we have provided a cyclic system for the extraction of aromatic hydrocarbons from a feed mixture containing aromatic hydrocarbons and nonaromatic hydrocarbons. Accordingly, a cyclic flowing stream of extract phase containing liquid HF and HF-soluble copper-fluoride aromatic hydrocarbon complex is maintained throughout the process in cycle flow. The cyclic flow constitutes an upward flow and downward flow in cyclic confinement. The flow of the cyclic stream is enclosed so that the stream substantially retraces its path for each cycle, with at least two portions of the path sufficiently vertical i.e. non-horizontal, to provide the upward flow and downward flow. A portion of the feed mixture is charged to the cyclic stream at a first intermediate position on the downward flow of the cyclic stream. A resulting first HF-insoluble hydrocarbon-soluble raffinate is withdrawn from the stream at a position upstream from the first intermediate position and on the downward flow of the stream. A hydrocarbon fraction containing aromatic hydrocarbons boiling outside the boiling range of the nonaromatic hydrocarbons of the feed mixture is charged to the stream on the downward flow thereof and downstream from the first intermediate position. A second hydrocarbon-soluble HF-insoluble raffinate results and is removed from the stream at a second intermediate position downstream from the first intermediate position and upstream from the position at which the hydrocarbon fraction is charged. The feed and hydrocarbon fraction are continuously charged and the raffinates are continuously withdrawn from the cyclic stream which is maintained in substantially continuous flow. Aromatic hydrocarbon products may be recovered from the raffinates as above. The flow of the cyclic stream is maintained at a substantially continuous rate of flow, which rate of flow is sufficiently low to permit substantially continuous countercurrent flow of separate hydrocarbon phases therethrough. The separate hydrocarbon phases are the first raffinate and second raffinate which are recovered from the cyclic system. The downward rate of flow of the cyclic stream should not be so great as to carry substantial amounts of these raffinates down to and out of the bottom of a given extraction zone and into the top of the next zone. In the above disclosed cyclic system, the zones, of course, are defined as those portions of the cyclic system lying (1) between the first intermediate position and the position upstream, and (2) between the position downstream from said first intermediate position and the second intermediate position. Additional similar zones of like definition may be added on the downward flow.

The extraction zones using this invention may be any multi-stage extraction zones. Advantageously, the extraction zones may be vertical extraction towers having therein horizontal plates, e.g. perforated plates or baffles, permitting downward flow of extract phase through the tower in stages. Such towers are well known in the extraction art. Although relative selectivity between aromatic hydrocarbons are usually fairly close together when using copper fluoride extraction agents, wherever differences in relative selectivity do exist advantage may be taken of such differences. Accordingly, in designing the extraction zone, fewer stages should be used for extracting the aromatic hydrocarbons of higher selectivity in a given zone, while more stages may be necessary in another extraction zone for extracting aromatic hydrocarbons of lower selectivity. Generally, lighter aromatic hydrocarbons are more selectively or strongly extracted probably because of the lower molecular weight and lesser number of alkyl groups on the aromatic nucleus, both of which appear to affect selectivity. However, usually there will not be very much difference in selectivity toward aromatic hydrocarbons over-all, even when comparing selectivity of aromatic hydrocarbons of diverse structure. Large differences in selectivity are the exception rather than the rule, but such large differences may exist in many cases. As one such exception, an example of sufficient differences in relative selectivity where separation advantages may be accordingly attained is the difference in selectivities for the copper fluoride toward ethylbenzene and xylene as is described by D. A. McCaulay in U.S. 2,914,585, patented November 24, 1959. Relative selectivities of other aromatic hydrocarbons may readily be determined by those skilled in the art using sample extractions.

In the separation process of this invention, any two or more feeds may be used, at least two of which differ from each other in that the boiling range of the aromatic hydrocarbons contained in one such feed differs from the boiling range of the nonaromatic hydrocarbons contained in the other such feed. Preferably, at least one feed may be one which is difficult to separate by distillation because of the closeness of boiling points between aromatic hydrocarbons and nonaromatic hydrocarbons. Although, as pointed out above, this process employs two different feeds, one such feed may hereinafter be referred to as a hydrocarbon fraction containing aromatic hydrocarbons. Such reference is used for convenience and clarity in differentiating feeds. However, it is to be understood that any of the herein defined feeds may be used as such hydrocarbon fraction containing aromatic hydrocarbons.

The feed to one treating zone of the process of this invention is an extraneous feed while the feed to the other zone may be either an extraneous feed or a feed produced by and within this inventive process. An example of a feed produced within the process and which may be used as a feed for one treating zone in the process is a high-purity aromatic hydrocarbon recovered from the raffinate removed from an extraction zone. Such a high-purity aromatic hydrocarbon may be recovered from the raffinate from any zone and may be conveniently recycled as a feed to the same zone or to another extraction zone. Also, as another example, a raffinate produced in this process may be used as a feed to a treating step or zone without prior concentration therein of high-purity aromatic hydrocarbons.

As disclosed above, it is important that the nonaromatic hydrocarbon components of a given feed charged to a given treating zone predominantly boil in a range differing from the predominant boiling range of the complex aromatic hydrocarbon component or components in the extract phase introduced into that zone. This requirement, however, does not totally exclude the presence of other hydrocarbons of similar boiling ranges from either the nonaromatic hydrocarbon component or the aromatic hydrocarbon component. There is sufficient difference in boiling ranges if 75%, and more advantageously, 90% of each of the two components boils in a range mutually exclusive from the range of the other component. Overlapping of boiling ranges, therefore, is entirely permissible. However, as a general rule, the more hydrocarbon of each component boiling in a range mutually exclusive of the boiling range of the other component, the greater purity in product which can be obtained from the raffinate of the given treating zone. For highest purity in product, there should be mutually exclusive differences in boiling ranges between the components. This condition of different boiling ranges may be readily met, for example, by using a hydrocarbon fraction substantially free of nonaromatic hydrocarbons as one feed.

Further, this process is particularly advantageous in separating two or more feeds of which at least two differ from each other in boiling ranges of aromatic hydrocarbons. For example, in a two-zone system, the feed to one zone may contain only benzene and toluene as aromatic hydrocarbon components while the aromatic hydrocarbon components of the feed to the other zone may be, for example, ethylbenzene, dimethylbenzene, methylethylbenzene and diethylbenzene, either alone or in addition to benzene and toluene. The aromatic hydrocarbons of both feeds may be recovered as high-purity aromatic hydrocarbon products in accordance herewith.

This process finds particular utility in an embodiment wherein feeds having close boiling aromatic hydrocarbons and nonaromatic hydrocarbons are used where at least two such feeds boil predominantly in mutually different boiling ranges. Such feeds are charged as separate feeds to treating zones connected in series with each other. An example of two such differing feeds is: (1) light naphtha reformate and (2) heavy naphtha reformate. These two differing feeds may be obtained, for example, by fractionating a full-range naphtha reformate. Thus, this process may advantageously include a fractional distillation or other fractionation step from which two different fractions may be recovered and charged to separate treating zones as separate feeds.

It appears that all aromatic hydrocarbons will form the complex with copper fluorides. The feeds or feed materials to this process may be any feeds containing aromatic and nonaromatic hydrocarbons. The nonaromatic hydrocarbon of at least two of the feeds used may advantageously differ from each other in boiling points or ranges to permit separation of product from the raffinates by distillation. Preferably the nonaromatic hydrocarbons of each feed are close boiling with respect to the aromatic hydrocarbons of the feed. The aromatic hydrocarbons may contain a single benzene ring or contain condensed benzene rings. The aromatic hydrocarbons may contain substituents on the ring or may be condensed rings wherein one or more of the rings is paraffinic or olefinic in nature. Examples of suitable benzene hydrocarbons are benzene, toluene, xylenes such as m-xylene, the various other polymethylbenzenes, such as mesitylene, isodurene, and hexamethylbenzene, ethylbenzene and the various polyethylbenzenes, isopropylbenzene, and the various polyisopropylbenzenes, also the various butyl and pentyl derivatives, such as t-butylbenzene, 2-phenylpentane, etc.; in addition to these, the substituted benzenes containing 2 or more different substituents such as ethyltoluene, isopropyltoluene, and ethylxylene. Examples of the naphthalene hydrocarbons which are suitable are naphthalene, the various methylnaphthalenes, and polymethylnaphthalenes, ethylnaphthalene and the various polyethylnaphthalenes, also the naphthalenes containing propyl, isopropyl, butyl, t-butyl and pentyl substituents. The naphthalenes containing olefinic substituents are suitable, for example, ethenyl naphthalene, propenyl naphthalene, and pentyl naphthalene. The various indanes are suitable. For example, methyl indanes, isopropyl indanes, etc. The various dihydronaphthalenes are suitable, such as the methyl, ethyl, propyl, t-butyl, and pentyl substituted tetrahydronaphthalenes.

It is preferred to utilize feeds containing benzene, naphthalene, and the various alkylbenzenes and alkyl-naphthalenes whose alkyl groups contain not more than 5 carbon atoms. Examples of these are benzene, ethylbenzene, toluene, metaxylene, naphthalene and α-methylnaphthalene.

In addition to the aromatic hydrocarbon complexes, copper fluoride also forms complexes with organo-sulfur compounds, such as mercaptans, thioethers, and disulfides. In general, these organo-sulfur compound-copper fluoride complexes are much more stable than are the aromatic hydrocarbon-copper fluoride complexes. It is difficult to recover the aromatic hydrocarbon from these organo-sulfur compound complexes. It is possible to separate a mixture of the aromatic hydrocarbon complex by decomplexing the aromatic hydrocarbons and separating the decomplexed aromatic hydrocarbons from the copper fluoride-organo-sulfur compound complex. This may be done by removing a portion of the extract phase, partially decomplexing the removed portion by distilling off most of the HF, recovering aromatic hydrocarbons from the distillate and discarding the sulfur compound complex or decomposing it by distilling the remainder of the HF therefrom for recovery of useable copper fluoride; the recovered aromatic hydrocarbon may be added to the corresponding aromatic hydrocarbon product. In view of difficulty in decomplexing the organo-sulfur compounds, it is preferred to operate on a feed mixture of aromatic hydrocarbons and nonaromatic hydrocarbons which is substantially free of organo-sulfur compounds.

Sulfur compounds may be removed from the feed by extracting lighter sulfur compounds with caustic or caustic methanol, or by destructive hydrogenation of mercaptan to $H_2S$ and distillation of the $H_2S$, or by other means known to the art.

Olefinic hydrocarbons, in the presence of the liquid HF, tend to alkylate the aromatic hydrocarbons. When it is desired to avoid degradation of aromatic hydrocarbons such as benzene, toluene, xylene, and ethylbenzene to higher boiling alkyl aromatics, it is preferred to use feeds which are substantially free of olefinic hydrocarbons. Small amounts of olefins can be tolerated by this system without substantial degradation of the aromatics. Where it is desired to eliminate or decrease olefins in the system, the olefins may be preferentially polymerized under conditions inhibiting alkylation of the aromatic. The olefins may also be preferentially hydrogenated to corresponding paraffins where olefin content in the feed is undesirable. Olefins may also be separated by physical means which are known to the art. Where it is desirable to prepare alkylated aromatics while separating, a convention method is to include sufficient amounts of olefins in a feed for the desired alkylation. Thus, this process may be used as a combination process for alkylating an aromatic hydrocarbon and separating the alkylated product.

A feed to the present process may be any mixture of aromatic hydrocarbons with nonaromatic hydrocarbons, e.g., paraffinic, cycloparaffinic, olefinic, diolefinic, etc., and preferably with saturated hydrocarbons, such as, for example, with paraffinic hydrocarbons. Mixtures containing aromatic hydrocarbons and cycloaliphatic hydrocarbons may also be separated by this process. It is also intended that mixtures containing aromatic hydrocarbons and olefins may be used as feeds, especially where alkylation can be tolerated or is desired.

A suitable feed to the separation process of the invention is a petroleum distillate boiling below about 700° F. The distillate boiling between about 100° F. and 450° F., i.e., the gasoline range, derived from the product of the catalytic reforming in the presence of hydrogen, of petroleum naphthas is particularly suitable as a source of aromatic hydrocarbons because of its very low sulfur content and olefinic hydrocarbon content. The entire naphtha boiling range material of the catalytic reformate may be used or any one of the narrower boiling range cuts closely boiling about a particular aromatic hydrocarbon, for example, the benzene fraction, the toluene fraction or the $C_8$ aromatic hydrocarbon fraction.

Other suitable feeds are, for example, other catalytic reformates such as those obtained from hydroforming with platinum, virgin or straightrun naphthas, virgin kerosene, natural gasoline (or casing-head gas), hydrogenated catalytic or thermally cracked fractions such as those obtained by hydrogenation with a cobalt-molybdena catalyst, etc. Suitable olefin-containing feeds are, for example, thermally cracked naphtha or gasoline, thermally cracked gas oil, catalytically cracked gas oil, catalytically cracked naphtha or gasoline, normally liquid mixtures of hydrocarbons (commonly termed "dripolene") formed as by-products in the high temperature pyrolysis of gaseous hydrocarbons in the preparation of ethylene, normally liquid hydrocarbon by-products from the pyrolysis of natural gas to form acetylene, aromatic fractions of coke oven gas, synthol hydrocarbons prepared by catalytic hydrogenation of carbon monoxide using an iron catalyst, by-products from the high temperature cracking of gas oils usually in the presence of steam such as in the production of olefins such as ethylene, propylene, and the like, catalytic reformates containing olefins such as obtained using a molybdenum catalyst, etc.

The copper fluorides are cuprous and cupric fluoride. The amount of aromatic hydrocarbon in a given feed which may be extracted in the present process is dependent upon the amount of copper fluoride in the extraction agent through which the raffinate passes during its formation. Further, there must also be a sufficient amount of liquid HF present as a carrier for the complex to provide complete solution of all complex and prevent precipitation of solid copper fluoride. The treating or contacting zones may be of any capacity desired and the amounts of copper fluoride and HF to be flowed through each zone can be calculated as set out herein below for any treating zone of a given capacity. The two cuprous fluorides do not behave in the same manner with respect to extraction efficiency. Cuprous fluoride appears to be present in the complex with two moles of aromatic hydrocarbon per mole of cuprous fluoride, while cupric fluoride appears to be present in complex with one mole of aromatic hydrocarbon per mole of cupric fluoride.

In the treating step, sufficient amounts of complex are used in a treating zone to provide from about .05 to about 5.0 moles of copper fluoride per mole of aromatic hydrocarbon and preferably about one mole of cuprous fluoride or about two moles of cupric fluoride per two moles of aromatic hydrocarbon in the feed to a treating zone. Advantageous separations may also be obtained using an amount of complex which will provide from about 0.5 mole to about 2.0 of cuprous fluoride or from about one mole to about 4 moles of cupric fluoride per two moles of aromatic hydrocarbon in the feed. Where the process employs feeds in subsequent treating zones which boil in different ranges, as little as 0.05 mole of copper fluoride may advantageously be employed per mole of aromatic hydrocarbon of feed being treated. For maximum sufficiency approximately the preferred amounts are used.

Desired amounts of extract phase relative to feed aromatic hydrocarbons in a treating zone may conveniently be provided by regulating feed flow rate and extract phase flow rate to the treating zone with reference to amounts of aromatic hydrocarbons and complex respectively contained in the feed and extract phase.

It is necessary that the copper fluoride in the treating zone be substantially anhydrous, i.e., in the anhydrous form. The cupric fluoride dehydrate available commercially does not form a complex with aromatic hydrocarbons in the presence of liquid HF. The presence of water has a deleterious effect on the extraction efficiency of the extraction agent. The process is carried out under essentially anhydrous conditions. The liquid HF utilized should be anhydrous or essentially so. Commercial grade anhydrous hydrofluoric acid which contains on the order of one to two weight percent of water is suitable for use in the process. Advantageously, at least about three moles of liquid HF may be used per mole of aromatic hydrocarbon in the feed mixture. It is preferred to operate with between about 5 and 15 moles of liquid HF per mole of aromatic hydrocarbon in the feed.

The HF-soluble copper-fluoride aromatic hydrocarbon complex used in accordance with this invention is charged to the treating zones in solution in liquid HF. The complex changes its composition with regard to the aromatic hydrocarbon as it travels through the treating zone. Although the complex is continually maintained throughout the extraction (disregarding any change in the aromatic hydrocarbon component thereof), at the beginning of the extraction process, i.e., in the first treating step or first treating zone, a prepared complex may be charged to the zone or may be prepared in situ within the zone. The complex may be prepared, for example, by contacting about 2 moles of aromatic hydrocarbon with one mole of cuprous fluoride in the presence of about 10 moles of liquid HF. Where cupric fluoride is used as the copper fluoride, the molar amounts of aromatic hydrocarbon with which it is contacted are about one-half those used with cuprous fluoride. The contacting temperature is advantageously in the range of from about —40 to about 150° C. The resulting complex is used in the presence of liquid HF as a solvent for the complex in the present system. Of course, as a feed material is charged to the stream on its downward flow, the aromatic hydrocarbon content of the complex changes and a raffinate is formed rising through the downward flow of complex and containing aromatic hydrocarbons displaced from the complex.

As a more convenient determination of an amount of liquid HF which may be used, the liquid HF usage may be between about 30 and 150 volume percent, based on the total feed mixture. This usage of liquid HF is particularly suitable when the feed to the process is a petroleum distillate containing between about 25 and 75 volume percent of aromatic hydrocarbons, for example, a catalytic reformate.

Most of liquid HF remains in the system throughout the process, although very small amounts of liquid HF may be removed from the system with the raffinates. However, the small amounts removed are separable from the raffinate or from the product by distillation and thus may be removed if desired for increased purity of product.

The cyclic stream or liquid HF solution of complex is actually the extract phase from each extraction zone. Liquid HF may be added to the extract phase as needed to replace any HF removed from the system. Also, make-up copper fluoride may be added when needed or desired either as solid copper fluoride or preferably in the form of a complex with aromatic hydrocarbon. Copper fluoride complex may be withdrawn and regenerated as needed.

The figure of the drawings illustrates a system in which an embodiment of the process of this invention may be carried out. The figure also illustrates an embodiment of the apparatus of this invention.

With reference to the figure and as a typical example of the use of an apparatus of this invention in carrying out an embodiment of the process of this invention, a first feed is charged through line 11 to extraction tower 12, and a second feed is charged through feed line 13 and valve 14 to extraction tower 15. The first feed is a hydrocarbon mixture of light aromatic hydrocarbons in the $C_6$ to $C_7$ range and light paraffins in the $C_5$ to $C_7$ range. The second feed is a hydrocarbon mixture of heavier aromatic hydrocarbons in the $C_8$ to $C_{10}$ range and heavier paraffinic hydrocarbons in the $C_8$ to $C_{10}$ range. The first and second feeds are conveniently obtained by fractionation of a full-boiling reformate containing $C_5$ to $C_{10}$ aromatic and paraffinic hydrocarbons. For convenience in this example, the aromatic hydrocarbons and paraffinic hydrocarbons of the first feed will be referred to as "light aromatics" and "light paraffinics" while the aromatic hydrocarbons and paraffinic hydrocarbons of the second feed will be referred to as "heavy aromatics" and "heavy paraffinics." A copper fluoride aromatic hydrocarbon complex in solution in liquid HF is prepared by contacting cuprous fluoride with the second feed in the presence of liquid HF and recovering the extract phase as the complex in solution in liquid HF. This contacting may conveniently be carried out within extraction tower 15 by charging the necessary components thereto. However, in the present example, the contacting to form the complex in solution in liquid HF is accomplished in a separate vessel (not shown.) The complex in solution is charged to recycle line 17 through valved line 16. The complex in solution, hereinafter referred to as the "extract phase," is pumped into tower 12 where it comes into contact with the first feed. Tower 12 is an extraction tower containing baffles defining a plurality of stages. Such towers are readily available. In tower 12, the extract phase flows downward by gravity flow and the first feed introduced through feed line 11 flows countercurrent to the extract phase. The extract phase is removed from tower 12 through recycle line 18 and now predominates in cuprous fluoride light aromatics complex in solution in liquid HF. A first raffinate phase formed in extraction tower 12 is removed through line 21 and contains light paraffinics, heavy aromatics, and very small amounts of light aromatics. The first raffinate is charged to fractionator 23 and is therein separated into two fractions. The lighter fraction is recovered from fractionator 23 through line 25 and contains light paraffinics and very small amounts of light aromatics. The light fraction may be condensed and cooled if desired. The heavier or bottoms fraction from fractionator 23 is removed through lines 27 and 28 and valve 29 as a first product. Valve 31 is maintained in closed position. The first product is substantially pure heavy aromatics.

The extract phase in recycle line 18 is charged to extraction tower 15 where it flows downwardly and countercurrent to the second feed charged through line 13. Displacement of aromatic hydrocarbons in the complex of the extract phase again occurs as it did in extraction tower 12, but in reverse order with regard to the equilibrium equation. A second raffinate is removed from extraction tower 15 through line 22. The second raffinate contains light aromatics and heavy paraffinics and very small amounts of heavy aromatics. Valved line 37 is maintained closed and valve 38 is maintained open, and the second raffinate is charged to fractionator 24 wherein two fractions are formed. The light fraction from fractionator 24 is removed through line 26 and may be cooled and condensed. The light fraction consists of substantially pure light aromatics. The heavier fraction is removed as bottoms from fractionator 24 through line 32, line 33 and valve 34. The bottoms fraction contains heavy paraffinics and very small amounts of heavy aromatics.

The extract phase is removed from extraction tower 15 through recycle line 17 and is again charged to extraction tower 12. First feed and second feed are continuously charged to extraction towers 12 and 15 respectively and extract phase is continuously flowed as a cyclic stream through extraction tower 12, recycle line 18, extraction tower 15, recycle line 17, and back to extraction tower 12. Make-up liquid HF will be charged as needed to valved line 16. Extract phase may be removed for regeneration of the copper fluoride extraction agent through valved line 19 and make-up extract phase for extraction agent may be charged through valved line 16. The cut-point ends in fractionators 23 and 24 may be adjusted as desired with regard to desired purity of product. The above described embodiment provides a process capable of continuous operation in separation of aromatic hydrocarbons from admixtures thereof from nonaromatic hydrocarbons.

Accessories for the flow herein, such as pumps, valves, gauges and the like have been omitted for the sake of clarity. Such accessories, however, and their positions will be easily supplied with the ordinary knowledge of the art by those having ordinary skill in the art wherever such accessories are needed or desired.

Again with reference to the figure and as illustration of another typical example of the operation of this invention, the illustrated embodiment provides operation of a process wherein a product stream is used as a second feed. The first feed of this embodiment is an ultraformate derived from the catalytic (platinum catalyst) reforming of a virgin naphtha in the presence of hydrogen and pressure. The ultraformate feed used as first feed in this embodiment is composed as follows:

| Paraffinic Hydrocarbons | | Aromatic Hydrocarbons | |
|---|---|---|---|
| $C_x$ | Moles [1] | $C_x$ | Moles [1] |
| $C_5$ | 7.41 | $C_6$ | 3.23 |
| $C_6$ | 7.80 | $C_7$ | 13.20 |
| $C_7$ | 11.28 | $C_8$ | 19.20 |
| $C_8$ | 7.45 | $C_9$ | 17.05 |
| $C_9$ | 2.96 | $C_{10}+$ | 9.32 |
| $C_{10}$ | 1.10 | | |
| Total [1] | 38.00 | | 62.00 |

[1] A total of 100 moles of aromatic and paraffinic hydrocarbons used as feed and traced throughout the process.

The first feed is charged to extraction tower 12 through line 11. As is readily seen through the above composition, the feed predominates in light paraffins ($C_5$ through $C_8$) and heavy aromatic ($C_9$, $C_{10}$ and higher). An extract phase obtained by treating heavy aromatics with cuprous fluoride in the presence of liquid HF, it is charged to recycle line 17 through valved line 16 and into extraction tower 12. The feed charged through line 11 is contacted in extractor 12 by countercurrent flow with the extract phase. A first raffinate is removed through line 21 and contains light paraffins and heavy aromatics and very small amounts of light aromatics. The first extract is charged to fractionator 23 and a light overhead of light paraffinics and very small amounts of light aromatics is taken through line 25 and may be cooled and condensed. This light fraction may be recharged to the reformer. The extract phase is removed from extraction tower 12 through recycle line 18 and charged to extraction tower 15.

Extraction towers 12 and 15, although illustrated as separate towers, may conveniently be one tower having continuous flow of extract phase therethrough. In such an arrangement, recycle line 18 is eliminated and tower 12 is stacked immediately on top of tower 15 with no restriction being necessary between the two towers. Line 22 is then moved to the side of the resulting single tower at a point below feed line 11.

The bottoms fraction from fractionator 23, with valve 29 closed, is charged through line 30 and valves 31 and 35 to line 13 with valve 14 closed. The bottoms fraction is a heavy aromatic fraction of high-purity. This fraction is contacted by countercurrent flow with the extract phase entering extraction tower 15 through recycle line 18. Displacement of aromatics in the complex occurs and a second raffinate is withdrawn through line 22. The second raffinate consists of heavy aromatics and light aromatics and may be withdrawn through valved line 37 as a product. However, in this example, it is desired to obtain the light aromatics and heavy aromatics as separate fractions and, therefore, the second raffinate is charged through valve 38 into fractionator 24 wherein the second raffinate is separated into two fractions. The light fraction is withdrawn through line 26 and may be cooled and condensed. This light fraction consists of high-purity light aromatics fraction and is obtained as the product from this example. The bottoms fraction from fractionator 24 consists of a high-purity heavy aromatics fraction and is removed through line 32 and charged to line 30 with valve 34 closed. The bottoms fractions from both fractionators consists of high-purity heavy aromatics and are recycled through line 30 to line 13 and are charged as a second feed to extractor 15.

Fractionator 24 is adjusted to provide only sufficient heavy aromatics as bottoms to supplement the bottoms from fractionator 23 and provide sufficient heavy aromatics for charging through lines 30 and 13 to extractor tower 15 for displacement of light aromatics from the extract phase entering extraction tower 15. In the present example, the cut-point of fractionator 24 is maintained so as to provide the following composition of product removed through line 26:

| Paraffinic Hydrocarbons | | Aromatic Hydrocarbons | |
|---|---|---|---|
| $C_x$ | Moles | $C_x$ | Moles |
| $C_5$ | 0 | $C_6$ | 1.8 |
| $C_6$ | 0 | $C_7$ | 11.4 |
| $C_7$ | 0 | $C_8$ | 18.5 |
| $C_8$ | .16 | $C_9$ | 16.8 |
| $C_9$ | 2.16 | $C_{10}+$ | 10.3 |
| $C_{10}$ | 1.1 | | |
| Total | 3.42 | | 58.8 |

The composition of the above product demonstrates the high-purity aromatic hydrocarbon fraction which may be separated from a feed mixture of aromatic and nonaromatic hydrocarbons in accordance herewith. This product contains 94.5% aromatic hydrocarbons and the recovery of aromatic hydrocarbons in the product was almost 95% based on amounts of hydrocarbon in the original ultraformate feed charged to tower 12.

The composition of aromatic hydrocarbons in line 27 from fractionator 23 is as follows:

| Paraffinic Hydrocarbons | | Aromatic Hydrocarbons | |
|---|---|---|---|
| $C_x$ | Mole Percent | $C_x$ | Mole Percent |
| $C_5$ | 0 | $C_6$ | 0 |
| $C_6$ | 0 | $C_7$ | 0 |
| $C_7$ | 0 | $C_8$ | 0.09 |
| $C_8$ | 0.15 | $C_9$ | 3.44 |
| $C_9$ | 2.11 | $C_{10}+$ | 54.80 |
| $C_{10}$ | 1.10 | | |
| Total | 3.36 | | 58.33 |

This composition of aromatic hydrocarbons in the bottoms of fractionator 23, or a portion thereof, may be taken as a product from the system. The 96+% purity of aromatic hydrocarbons is further illustrative of high-purity aromatic hydrocarbons obtainable from the system. The sharpness of separation among different aromatic hydrocarbons is also illustrated by the above data.

Again in this example as in the prior example, the process is continuously operated by continuously charging feed through line 11, continuously providing the cyclic stream of extract phase, continuously removing product from line 26 and continuously recycling sufficiently aromatics from lines 27 and 32 to extraction zone 15.

Under continuous operation, heavy aromatics removed through line 32 are mixed with heavy aromatics from line 27 to provide the following composition for use as a second feed containing high-purity heavy aromatics in line 30 for charging to extraction tower 15:

| Paraffinic Hydrocarbons | | Aromatic Hydrocarbons | |
|---|---|---|---|
| $C_x$ | Mole percent | $C_x$ | Mole percent |
| $C_5$ | 0 | $C_6$ | 0 |
| $C_6$ | 0 | $C_7$ | 0 |
| $C_7$ | 0 | $C_8$ | 0.49 |
| $C_8$ | 0.15 | $C_9$ | 9.44 |
| $C_9$ | 2.25 | $C_{10}+$ | 175.6 |
| $C_{10}$ | 3.30 | | |
| Total | 5.70 | | 185.53 |

The above composition or a portion thereof may be taken as a product if desired. The composition contains about 97% aromatic hydrocarbons, a very high-purity product. Further, about 99.7% of the aromatic hydrocarbons are in the $C_9$ to $C_{10}+$ range. It is a characteristic of the preferred embodiment of this invention that the extract phase containing a complex of a given aromatic hydrocarbon with copper fluoride is charged to the top or upper end of an extraction zone and the raffinate containing the given aromatic hydrocarbons is removed from the same upper end of the same extraction zone.

It is an advantage of this invention that problems arising from handling solid copper fluoride, e.g., attrition and the like, are eliminated in the process and apparatus of this invention. Further, it is an advantage of this invention that very little heat is required in the preferred embodiment because the extract phase is merely pumped from one extraction zone to another and vaporization of the HF is not required. Thus, it is not necessary to maintain substantial temperature difference between zones. As an additional advantage, dual solvent systems, normally used to change selectivities of solvents in solvent extraction processes, are unnecessary. This invention eliminates equipment for handling dual solvents, solid copper fluoride, and vaporized HF. Additionally, in accordance with the invention herein described, it has been further found that sharper separations are attainable between aromatic hydrocarbons in comparison with most solvent extraction systems. The process of this invention is particularly advantageous in separating greater than about 90% of the aromatic hydrocarbons from a feed mixture of aromatic hydrocarbons and nonaromatic hydrocarbons as a high-purity product of at least about 90% purity.

It is evident from the foregoing that we have provided an integrated combination process for the separation of aromatic hydrocarbons from a feed containing a mixture of aromatic hydrocarbons and nonaromatic hydrocarbons and especially where the feed contains close boiling aromatic hydrocarbons and nonaromatic hydrocarbons.

We claim:

1. The method of refining a feed material containing a hydrocarbon mixture of aromatic hydrocarbons and close boiling nonaromatic hydrocarbons, which method comprises treating in liquid phase said feed material containing said feed hydrocarbon mixture with liquid HF and a first complex containing predominantly aromatic hydrocarbons boiling in a range different from the boiling range of the nonaromatic hydrocarbons in said feed material, whereby a first HF-soluble extract phase containing liquid HF and containing a second HF-soluble copper fluoride aromatic hydrocarbon complex is formed and a first hydrocarbon-soluble raffinate phase substantially insoluble in liquid HF is formed, the aromatic hydrocarbon of said second complex predominating in said aromatic hydrocarbon of said feed material, recovering said first extract from said first raffinate, treating the recovered first extract with an aromatic hydrocarbon corresponding to the aromatic hydrocarbon of said first complex whereby there are formed a second hydrocarbon-soluble raffinate phase substantially insoluble in liquid HF and a second HF-soluble extract phase containing liquid HF and an HF-soluble copper fluoride-aromatic hydrocarbon complex corresponding substantially to said first complex, separating by distillation a substantially enriched fraction of aromatic hydrocarbons of said feed material from said first raffinate as a first product, recycling said second extract to the first treating step as said liquid HF and first complex, and separating by distillation a substantially rich fraction of aromatic hydrocarbons of said second complex from said second raffinate as a second product.

2. The method of claim 1 wherein said aromatic hydrocarbon of said first complex is higher boiling than said non-aromatic hydrocarbon of said feed material.

3. The method of claim 1 wherein the aromatic hydrocarbon of said first complex boils in a range differing from the aromatic hydrocarbons of said second complex.

4. The method of claim 1 wherein the treating of recovered first extract is with a high-purity aromatic hydrocarbon corresponding to the aromatic hydrocarbon of said first complex.

5. The method of claim 4 wherein said feed material is a mixture predominating in $C_6$ to $C_8$ paraffinic hydrocarbons and $C_6$ to $C_{10}$ aromatic hydrocarbons and said aromatic hydrocarbons of said first complex is a mixture predominating in $C_9$ and $C_{10}$ aromatic hydrocarbons.

6. The method of claim 1 which includes the additional steps of recovering aromatic hydrocarbon corresponding to the aromatic hydrocarbon of said first complex from said first raffinate and recycling a portion thereof to the second treating step as said aromatic hydrocarbon corresponding to the aromatic hydrocarbon of said first complex.

7. The method of claim 1 which includes the additional step of recycling a portion of said second product to said second treating step.

8. The method of claim 1 wherein the treating of recovered first extract is with a second hydrocarbon feed mixture containing aromatic hydrocarbons and paraffinic hydrocarbons and the paraffinic hydrocarbons of said second feed mixture boil in a range differing from the boiling range of the aromatic hydrocarbons of the first-recited feed mixture.

9. The method of claim 8 wherein said second hydrocarbon mixture is a mixture predominating in $C_9$ and $C_{10}$ aromatic and paraffinic hydrocarbons and said first-recited feed mixture is a mixture predominating in $C_6$ to $C_8$ aromatic and paraffinic hydrocarbons.

10. In a process for separating aromatic hydrocarbons from a feed containing aromatic hydrocarbons and close boiling nonaromatic hydrocarbons wherein copper fluoride is treated in the liquid phase with a portion of said feed in the presence of liquid HF and there is formed a resulting extract phase containing an HF-soluble aromatic hydrocarbon-copper fluoride complex and liquid HF the improvement which comprises displacing the aromatic hydrocarbon from said complex by treating said extract phase with a hydrocarbon fraction containing another aromatic hydrocarbon boiling in a different range from the feed nonaromatic hydrocarbons whereby feed aromatic hydrocarbons are displaced from said complex and are replaced by said other aromatic hydrocarbon of said complex in said extract phase, separating a resulting first hydrocarbon-soluble raffinate from said extract phase, said first raffinate containing aromatic hydrocarbon of said hydrocarbon fraction displaced from said complex, subsequently treating said extract phase with another portion of said feed whereby the other aromatic hydrocarbons are displaced from said complex and are replaced by feed aromatic hydrocarbons, separating a resulting second hydrocarbon-soluble raffinate from said extract phase, recovering from said first raffinate by distillation an aromatic fraction rich in aromatic hydrocarbons of said hydrocarbon fraction, recovering from said second raffinate by distillation an aromatic fraction rich in aromatic hydrocarbons of said feed, and recovering said extract phase capable of having complexed feed aromatic hydrocarbons displaced therefrom by contact with a hydrocarbon fraction containing aromatic hydrocarbons and nonaromatic hydrocarbons, said nonaromatic hydrocarbons boiling in a different range from the feed aromatic hydrocarbons.

11. A cyclic system for extraction of aromatic hydrocarbons from a feed mixture containing aromatic hydrocarbons and close boiling nonaromatic hydrocarbons, which comprises (1) maintaining a cyclic flowing stream of liquid HF and HF-soluble copper fluoride-aromatic hydrocarbon complex whereby said cyclic stream flows alternatively downward and upward in cyclic confinement, (2) charging a portion of said feed mixture to said stream at a first intermediate position on the downward flow thereof, (3) withdrawing a resulting first HF-soluble hydrocarbon-soluble raffinate from said stream at a position upstream from said first intermediate position and on the downward flow of said stream, (4) charging to said stream on the downward flow thereof and downstream from said first intermediate position a hydrocarbon fraction containing aromatic hydrocarbons boiling outside the boiling range of the nonaromatic hydrocarbons of said feed mixture, (5) withdrawing a resulting second HF-insoluble hydrocarbon-soluble raffinate from said stream at a second intermediate position on the downward flow of said stream and downstream from said first intermediate position, concurrently carrying out steps (1), (2), (3), (4) and (5) in substantially continuous flow while maintaining the flow of said stream at a substantially continuous rate sufficiently low to provide substantially continuous countercurrent flow of separate hydrocarbon phases of said first raffinate and said second raffinate therethrough, fractionating second raffinate from step (5) to recover therefrom a first high-purity aromatic hydrocarbon product predominating in aromatic hydrocarbons of said feed mixture and fractionating a portion of said first raffinate from step (3) to recover therefrom a second high-purity aromatic hydrocarbon product predominating in aromatic hydrocarbons of said hydrocarbon fraction.

12. The system of claim 11 wherein a portion of said first raffinate is recycled to step (4) as said hydrocarbon fraction.

13. The system of claim 11 wherein second product is recycled to step (4) as said hydrocarbon fraction.

14. The system of claim 11 wherein make-up liquid HF is added to said stream.

15. The system of claim 11 wherein fresh copper fluoride is intermittently added to said stream.

16. The method of refining a feed material containing a hydrocarbon mixture of aromatic hydrocarbons and close boiling nonaromatic hydrocarbons, which method comprises contacting in liquid phase said feed material containing said feed hydrocarbon mixture with liquid HF and a first HF-soluble copper fluoride aromatic hydrocarbon complex at a temperature in the range of from about −40 to about 150° C., the aromatic hydrocarbon of said first complex containing predominantly aromatic hydrocarbons boiling in a range substantially different from the boiling range of the nonaromatic hydrocarbons in said feed material, whereby a first HF-soluble extract phase containing liquid HF and containing a second HF-soluble copper fluoride-aromatic hydrocarbon complex is formed and a first hydrocarbon-soluble raffinate phase substantially insoluble in liquid HF is formed, the aromatic hydrocarbon of said second complex predominating in said aromatic hydrocarbon of said feed material, recovering said first extract from said first raffinate by separating phases, treating the recovered first extract with an aromatic hydrocarbon corresponding to the aromatic hydrocarbon of said first complex at a temperature in the range of from about −40 to about 150° C. whereby there are formed a second hydrocarbon-soluble raffinate phase substantially insoluble in liquid HF and a second HF-soluble extract phase containing liquid HF and an HF-soluble copper fluoride aromatic hydrocarbon complex corresponding substantially to said first complex, separating a substantially rich fraction of aromatic hydrocarbons of said feed material from said first raffinate as a first product by distillation of said first raffinate at a temperature in the range of from about 50° to about 400° C., recycling said second extract to the first treating step as said liquid HF and first complex, and separating a substantially rich fraction of aromatic hydrocarbons of said second complex from said second raffinate as a second product by distillation of said second raffinate at a temperature in the range of from about 50° C. to about 400° C.

17. The method of claim 16 wherein the feed mixture is a mixture of low-boiling aromatic hydrocarbons and low-boiling paraffinic hydrocarbons, the aromatic hydrocarbons of said first complex are higher boiling aromatic hydrocarbons, the treating of recovered first extract is with a mixture of said higher boiling aromatic hydrocarbons and higher boiling paraffinic hydrocarbons, the separating of feed aromatic hydrocarbons from the first raffinate is by distilling the feed aromatics overhead as the first product while retaining higher boiling paraffinic hydrocarbons as bottoms, and the separating of aromatic hydrocarbons from the second raffinate is by distilling the low-boiling paraffins overhead and recovering the resulting bottoms fraction as the second product.

References Cited in the file of this patent

UNITED STATES PATENTS

| | | |
|---|---|---|
| 2,738,372 | Talbot | Mar. 13, 1956 |
| 2,830,105 | Mackor | Apr. 8, 1958 |
| 2,914,584 | McCaulay et al. | Nov. 24, 1959 |
| 2,914,585 | McCaulay et al. | Nov. 24, 1959 |
| 2,935,467 | Fleck et al. | May 3, 1960 |